US012653220B2

(12) United States Patent
Rivoltini et al.

(10) Patent No.: US 12,653,220 B2
(45) Date of Patent: Jun. 16, 2026

(54) LOW CALORIE FOOD PREPARATION FOR THE NUTRITION OF CANCER PATIENTS

(71) Applicant: FONDAZIONE IRCCS ISTITUTO NAZIONALE DEI TUMORI, Milan (IT)

(72) Inventors: Licia Rivoltini, Milan (IT); Claudio Vernieri, Milan (IT); Filippo Guglielmo De Braud, Milan (IT)

( * ) Notice: Subject to any disclaimer, the term of this patent is extended or adjusted under 35 U.S.C. 154(b) by 885 days.

(21) Appl. No.: 17/620,770

(22) PCT Filed: Jun. 24, 2020

(86) PCT No.: PCT/IB2020/055956
§ 371 (c)(1),
(2) Date: Dec. 20, 2021

(87) PCT Pub. No.: WO2020/261131
PCT Pub. Date: Dec. 30, 2020

(65) Prior Publication Data
US 2022/0338522 A1      Oct. 27, 2022

(30) Foreign Application Priority Data

Jun. 24, 2019    (IT) ......................... 102019000009954

(51) Int. Cl.
| *A61K 36/00* | (2006.01) |
| *A23L 33/00* | (2016.01) |
| *A23L 33/115* | (2016.01) |
| *A23L 33/125* | (2016.01) |
| *A23L 33/185* | (2016.01) |
| *A23L 33/21* | (2016.01) |

(52) U.S. Cl.
CPC ............. *A23L 33/40* (2016.08); *A23L 33/115* (2016.08); *A23L 33/125* (2016.08); *A23L 33/185* (2016.08); *A23L 33/21* (2016.08)

(58) Field of Classification Search
None
See application file for complete search history.

(56) References Cited

U.S. PATENT DOCUMENTS

| | | | | |
|---|---|---|---|---|
| 8,865,646 | B2 * | 10/2014 | Longo | .................... A61K 31/70 514/19.2 |
| 2011/0118528 | A1 * | 5/2011 | Longo | ....................... A61P 3/02 514/517 |
| 2014/0011749 | A1 | 1/2014 | Lynch | |
| 2014/0227373 | A1 * | 8/2014 | Longo | .................. A61K 31/198 514/274 |
| 2015/0133370 | A1 | 5/2015 | Longo | |
| 2016/0175378 | A1 | 6/2016 | Bistrain et al. | |
| 2016/0303056 | A1 * | 10/2016 | Longo | .................... A61P 43/00 |
| 2018/0214410 | A1 | 8/2018 | Hagihara et al. | |
| 2018/0228198 | A1 * | 8/2018 | Brandhorst | ............... A23F 3/40 |

FOREIGN PATENT DOCUMENTS

RU       2286679  C1    11/2006

OTHER PUBLICATIONS

Castellano et al. (2023) Nutrients 15: 4677 (14 pages) (Year: 2023).*
Longo et al. (2009) Trends in Phamacological Sciences, vol. 31, No. 2: 89-98. (Year: 2009).*
Meynet et al. (2014) Trends in Molecular Medicine vol. 20, No. 8: 419-427. (Year: 2014).*
Trumbo et al. (2002) J. Amer. Dietetic Assoc. vol. 102, No. 11: 1621-1630. (Year: 2002).*
Vidoni et al. (2021) J. Cancer Prev. 26(4): 224-236. (Year: 2021).*
Pelley R.P. et al., "Plants, polysaccharides and the treatment and prevention of neoplasia", Critical Reviews in Oncogenesis, Boca Raton, FL, vol. 11, No. 3&4, Jan. 1, 2000, pp. 189-225.
Search Report and Written Opinion of PCT/IB2020/055956 of Sep. 29, 2020.

* cited by examiner

*Primary Examiner* — Russell G Fiebig
(74) *Attorney, Agent, or Firm* — Silvia Salvadori, P.C.; Silvia Salvadori

(57)          ABSTRACT

Daily food preparation for use as a therapeutic adjuvant in the diet of patients suffering from neoplasia, including A) a nutritional combination that contains carbohydrates in an amount between 8% and 55% (w/w), proteins in an amount between 7% and 16% (w/w), lipids in an amount between 30% and 81% (w/w); and B) dietary fiber in an amount between 2 and 30 g, the food preparation being characterized by an average caloric content between 15 and 600 Kcal, in which the nutritional combination (A) and the dietary fiber (B) consist of foods of vegetable origin. A further object of the present invention is a kit comprising daily food preparations in accordance with claim 1 for use as a therapeutic adjuvant in the daily diet of patients suffering from neoplasias.

6 Claims, No Drawings

LOW CALORIE FOOD PREPARATION FOR THE NUTRITION OF CANCER PATIENTS

This application is a U.S. national stage of PCT/IB2020/055956 filed 24 Jun. 2020, which claims priority to and the benefit of Italian Application No. 102019000009954 filed on 24 Jun. 2019, the contents of which are incorporated herein by reference in their entireties.

FIELD OF THE INVENTION

The present patent application concerns a nutrition plan for patients suffering from different types of neoplasias. It is applicable, on a three-week or four-week basis, before, during and after the administration of different types of anticancer treatments, including radiation therapy, chemotherapy, immunotherapy or endocrine and biological therapies, and also in patients not receiving active anticancer treatments.

BACKGROUND OF THE ART

The discovery of oncogenes and tumor suppressor genes (TSGs) revealed the biochemical basis of the impact of some metabolic pathways of tumor cells on some peculiar features of tumors, including e.g. uncontrolled proliferation, non-dependence from stimulation of growth factors and resistance to apoptosis.

The metabolism is the assemble of biochemical transformations that take place inside the cells and which include, e.g., the catabolic processes of energy unit production (in the form of ATP or reducing equivalents) and the anabolic processes of complex biomolecule synthesis, such as proteins, lipids and DNA. The metabolic pathway that has been most studied and successfully used in anticancer treatments is the synthesis of nucleotides and deoxynucleotides. Other metabolic pathways have only recently become research focus, based on new discoveries and by virtue of the plateau reached in terms of improving efficacy with traditional therapies.

Similar to highly proliferative healthy cells, cancer cells need a constant supply of ATP and anabolic precursors to support crucial biochemical processes, such as DNA synthesis and repair, protein and lipid synthesis, protein post-translational modifications, formation and re-assembly of membranes and organelles, vesicular transport of intracellular cargo and endocytosis.

It has been observed that many tumors are characterized by reprogramming mechanisms of oncogene-dependent metabolic pathways, e.g., while the mitochondrial oxidation of pyruvate deriving from glucose represents the main source of ATP for healthy proliferative cells, in cancer cells the synthesis of pyruvate is diverted to lactate synthesis metabolism from the mitochondrial oxidation one.

Recent studies have shown that not only glycolysis, but also other metabolic pathways can be regulated differently in cancer cells than in the cells of the corresponding normal tissues. Furthermore, the relationship between oncogenes/TSGs and metabolic reprogramming suggests that the altered regulation of metabolisms crucially contributes to the uncontrolled proliferation of the neoplastic cell.

Therefore, diet changes could have an impact on tumor growth by changing the plasma concentration of different biomolecules and metabolites that support the proliferation and other biological functions of cancer cells. Given the great variety of possible approaches and their unpredictable and complex impact on the multiplicity of blood metabolites, it is not obvious or immediate to be able to design the "ideal" anticancer diet which is safe, well tolerated and accepted by patients and, at the same time, biologically active and effective.

Since moderate chronic calorie restriction significantly reduces tumor incidence in primates and other mammal species, many anti-cancer dietary approaches currently under study are based on the assumption that restriction/modulation of nutrient intake can reduce the cancer cell uptake of metabolites (Vernieri C, Casola S, Foiani M, Pietrantonio F, de Braud F, Longo V. Targeting Cancer Metabolism: Dietary and Pharmacologic Interventions. *Cancer Discov.* 2016; 6(12):1315-1333. doi:10.1158/2159-8290.CD-16-0615).

SUMMARY OF THE INVENTION

The Applicant has now identified a specific combination of nutrients, suitable for preparing low-calorie, low-carbohydrate and low-protein meals, useful in patients suffering from different types of neoplasias.

The object of the present invention is a daily food preparation for use as a therapeutic adjuvant in the diet of patients suffering from neoplasia, including A) a nutritional combination that contains
   carbohydrates in an amount ranging from 8% and 55% (w/w),
   proteins in an amount ranging from 7% and 16% (w/w),
   lipids in an amount ranging from 30% and 81% (w/w); and
B) dietary fibre in an amount ranging from 2 and 30 g, the food preparation being characterized by an average caloric content between 15 and 600 Kcal, wherein the nutritional combination (A) and the dietary fibre (B) consist of foods of vegetable origin.

A further object of the present invention is a kit comprising food preparations according to claim 1 for use as therapeutic adjuvants in the daily diet of patients affected by neoplasias.

DETAILED DESCRIPTION OF INVENTION

According to the scope of the present invention, by food preparation (or nutrition plan) is meant a combination of foods suitable for the arrangement of one or more meals.

By daily food preparation, is meant a combination of foods intended to provide sufficient caloric content for one day; in other words, the food preparation of the invention is intended for daily use, as a therapeutic adjuvant in the diet of patients suffering from neoplasias.

By therapeutic adjuvant is meant a biologically active substance or a set of biologically active substances, to be taken in combination with anticancer therapies, to enhance their therapeutic effects. In the present case, such biologically active substances are taken through the diet, with the food preparations of the present invention.

By patients suffering from neoplasias is meant subjects who have been diagnosed by a medical specialist with a malignant tumor of any type, at any stage of growth; examples of neoplasias in subjects suitable for the diet with the food preparation of the invention are breast cancer, colorectal cancer, lung cancer, prostate cancer, melanoma, chronic lymphatic leukemia.

As indicated above, the daily caloric content of the food preparation is between 15 Kcal and 600 Kcal, preferably between 100 and 600 Kcal, more preferably between 300 and 600 Kcal. This daily calorie content is low enough to induce specific metabolic effects, including a reduction in the blood concentration of glucose, insulin and insulin-like growth factor (IGF-1), which constitute the metabolic prerequisite for the expected immunomodulatory and anticancer effects to occur.

It should be noted that the maximum calorie content during each diet day is the same for each patient, regardless of weight or other anthropometric parameters (height, body mass index, body composition). The minimum caloric content, on the other hand, is potentially different from patient to patient, as it depends on the ability of each patient to consume the maximum amount of food intended by the schedule or, alternatively, only a part of it.

It should be noted that, according to an embodiment of the invention which is not the subject of the present patent application, the patient suffering from neoplasm can also be subjected to a fasting regime (0 Kcal/day) for a maximum duration of 5 consecutive days.

Generally, by food we mean a substance that, introduced into the animal organism, compensates for its expenditure in living force, provides for the reintegration matter, necessary for any growth, and such factors (proteins, fats, carbohydrates, vitamins, minerals) which are essential for the normal performance of fundamental functions for the individual and the species. In the science of nutrition, simple foodstuff, i.e., proteins, carbohydrates or carbohydrates, lipids or fats, vitamins and minerals, and compound foodstuff, consisting in various proportions of simple foods (milk, meat, fruit, etc.) are distinguished. More generally, by foodstuff is meant food (http://www.treccani.it/vocabolario/alimento/).

In view of the above-mentioned definitions, according to the scope of the invention, by foodstuff is meant a compound food which, for the purposes of carrying out the food preparation of the invention, is of vegetable origin.

By food of vegetable origin is meant a food consisting of vegetables or which is obtained from the vegetable (such as vegetable oils) by chemical/physical treatment of the source plant.

The daily food preparation of the invention comprises a nutritional combination (A) containing carbohydrates in an amount comprised between 8% and 55% (w/w), preferably between 9% and 54% (w/w), preferably between 10% and 54% (w/w), preferably between 10.33% and 53.4% (w/w), proteins in an amount comprised between 7% and 16% (w/w), preferably between 8% and 15% (w/w), preferably between 9% and 15% (w/w), preferably between 9.95% and 14.47% (w/w), lipids in an amount comprised between 30% and 81% (w/w), preferably between 31% and 80% (w/w), preferably between 32% and 80% (w/w), preferably between 32.89% and 79.28% (w/w); and dietary fiber (B) in an amount comprised between 2 and 30 g, preferably between 3 g and 29 g, preferably between 4 g and 28 g, preferably between 4.15 g and 27.55 g.

Foodstuffs containing vegetable fiber are included in the daily food preparation as "bulking agents", which are capable to increase the diet bulk without causing a significant increase in its calorie content.

It should be noted that the percentages of each nutrient (carbohydrates, proteins, lipids) are percentages by weight calculated on the total weight of the nutritional combination (A).

According to a preferred embodiment, at least 83% by weight of the nutritional combination (A) consists of carbohydrates and lipids. More preferably, the nutritional combination (A) consists of between 83% and 91% by weight (w/w) of carbohydrates and lipids.

The carbohydrates of the daily food preparation of the invention preferably comprise between 4% and 63% (w/w) by weight of starches; between 42% and 95% (w/w) by weight of soluble carbohydrates.

The lipids of the daily food preparation preferably comprise between 7% and 16% (w/w) by weight of saturated fat; between 26% and 65% (w/w) by weight of monounsaturated fats; between 1% and 18% (w/w) by weight of polyunsaturated fats.

The proteins of the daily food preparation preferably consist of 100% vegetable proteins.

The dietary fiber of the daily food preparation preferably comprises between 10% and 18% (w/w) by weight of soluble fiber; between 38% and 87% (w/w) by weight of insoluble fiber.

The caloric content of each of the foods contained in the daily food preparation was calculated on the basis of data available on the website www.crea.gov.it (website of "Consiglio per la Ricerca in Agricoltura e per l'analisi dell'economia agraria"), based on the INRAN data set (nut.entreca.it).

The carbohydrates contained in the daily food preparation preferably and mostly originate from bread and fruit.

The proteins of the daily food preparation preferably originate from whole wheat bread, vegetables, plant seeds and combinations thereof.

The lipids of the daily food preparation preferably originate from wholemeal bread, extra virgin olive oil, plant seeds and combinations thereof.

The fibers contained in the daily food preparation preferably originate from whole wheat bread, vegetables, fruit, and combinations thereof.

The daily food preparation of the invention is particularly advantageous as is extremely versatile; in order to improve the efficacy of anticancer therapies, the patient suffering from neoplasia who intends to be on a diet with the preparation of the invention, can make prepare various dishes and choose to consume the foodstuffs both cooked and raw, in liquid form (e.g. smoothies) or in solid form, depending on the preference.

The form in which the patient intends to take the foodstuffs of the preparation, in fact, does not affect the diet biological (immunological or metabolic) effects, which are attributable to the calorie, carbohydrate and protein restriction that characterizes the food preparation of the invention.

Preferably, the daily food preparation of the invention further comprises aqueous drinks in a total amount of between 1.5 L and 3.0 L, more preferably between 2.0 and 2.5 L.

According to a preferred embodiment, the daily food preparation according to the invention provides for the intake of at least 2 liters of liquids per day during the autumn/winter season and at least 2.5 liters of liquids per day during the spring/summer season. The intake of liquids in such quantities is important to ensure adequate hydration, in order to dispose of the organic acids (e.g. acetoacetic acid, beta-hydroxybutyric acid and uric acid) that accumulate in the blood during the diet, and also as a remedy for decreased sense of thirst that can be associated with calorie restriction. In order to stimulate thirst, and therefore to guarantee a sufficient intake of liquids to the patient, the food preparation provides for the possibility of intaking various non-caloric, water-based drinks.

By non-caloric drink is meant a drink having an average caloric content lower than 10 Kcal/liter.

Preferably, the non-caloric aqueous drink is selected from the group consisting of water, green or black tea, non-caloric herbal teas, and combinations thereof.

It should be noted that, despite the calorie content per liter, the daily food preparation allows the intake of coffee (espresso); preferably, the coffee (espresso) is taken in quantities not exceeding two cups a day (about 8 cl, equivalent to about 5 Kcal).

According to a preferred embodiment, the daily food preparation further includes a non-caloric aqueous drink, selected from the group consisting of water, green or black tea, non-caloric herbal teas, and combinations thereof, and/or coffee.

It should be noted that the daily food preparation according to the invention is suitable for use as a therapeutic adjuvant in the diet of subjects suffering from neoplasias for a maximum of 5 consecutive days, and can be repeated on a three-week or four-week basis. Preferably, the daily food preparation is suitable for use as a therapeutic adjuvant in the diet of subjects suffering from neoplasias for a period of between 1 and 5 days, preferably between 2 and 5 days, preferably between 3 and 5 days, preferably between 4 and 5 days.

It should be noted that, according to a preferred embodiment, the daily food preparation contains about 450-600 Kcal during the first day, and about 150-300 Kcal, each day, in the following four (second, third, fourth and fifth) days.

The patients who take the daily food preparation of the present invention are preferably subjects suffering from neoplasias undergoing a radiotherapy and/or chemotherapy anticancer treatment, or undergoing an immunotherapeutic anticancer treatment, an endocrine anticancer treatment, or an anticancer treatment with molecularly targeted biological drugs, or not undergoing any anticancer treatment.

Preferably, in cases of radiotherapy and/or chemotherapy anticancer treatments, non-radio/chemotherapy anticancer treatments, the food preparation according to the invention is taken before (neo-adjuvant), during (co-adjuvant) and after (adjuvant) the administration of the treatment.

More preferably, in the case of anticancer radiotherapy and/or chemotherapy, immunotherapy, endocrine treatment or anticancer treatment with molecularly targeted biological drugs, the food preparation according to the invention is taken starting from two days before the start of the administration of the treatment and until completion of the five-day diet (i.e. up to about 72 hours after starting the anticancer treatment).

For example, in patients receiving intravenous treatments (e.g. chemotherapy, immunotherapy) the diet is started two days before the administration of the treatment, ending on the third day after the start of the administration thereof; in patients receiving oral chemotherapy treatment, the diet is preferably started two days before the start of therapy, and continued until the completion of the five days, regardless of the chemotherapy schedule; in patients receiving radiotherapy treatment, the experimental diet is preferably started two days before the start of radiation therapy, and continued for 5 days; in patients receiving non-chemotherapy oral therapies, the diet is preferably started at the beginning of oral therapy, or during the course thereof, and continued until the completion of the five days.

Preferably, in cases where the patient does not receive any anticancer treatment, the food preparation is administered on a three- or four-week basis for a duration of five consecutive days.

1st Embodiment

According to a first embodiment, the daily food preparation of the invention comprises a nutritional combination (A1) comprising:

carbohydrates in an amount comprised between 51% and 55% by weight on the total weight of the nutritional combination (w/w), preferably between 52% and 54% (w/w), preferably between 53% and 54% (w/w), preferably of 53.4% (w/w), proteins in an amount comprised between 11% and 15% by weight on the total weight of the nutritional combination (w/w), preferably between 12% and 14% (w/w), preferably between 13% and 14% (w/w), preferably of 13.5% (w/w), lipids in an amount comprised between 30% and 34% by weight on the total weight of the nutritional combination (w/w), preferably between 31% and 33% (w/w), preferably between 32% and 33% (w/w), preferably of 32.89% (w/w);

dietary fiber (B1) in an amount comprised between 25 g and 29 g, preferably between 26 g and 28 g, preferably between 27 g and 28 g, preferably of 27.55 g, the first embodiment of the daily food preparation being characterized by a average caloric content between 450-600 KCal, in which the nutritional combination (A1) and dietary fiber (B1) consist of foods of vegetable origin.

Preferably, the first embodiment of the daily food preparation is characterized by an average caloric content of about 600 Kcal.

Preferably, such first embodiment is intended for use as an adjuvant for the diet of patients suffering from neoplasia for a period of 1 day.

More preferably, said first embodiment is intended for use as an adjuvant the diet of patients suffering from neoplasia on day one of the diet.

According to a preferred embodiment, at least 84% by weight of the nutritional combination (A1) consists of carbohydrates and lipids. More preferably, the nutritional combination (A1) consists of between 84% and 88% by weight (w/w) of carbohydrates and lipids.

The carbohydrates of the daily food preparation of the invention preferably comprise between 59% and 63% (w/w) by weight of starches; between 42% and 46% (w/w) by weight of soluble carbohydrates.

The lipids of the daily food preparation preferably comprise between 12% and 16% (w/w) by weight of saturated fat; between 61% and 65% (w/w) by weight of monounsaturated fats; between 13% and 17% (w/w) by weight of polyunsaturated fats.

The dietary fiber (B1) of the daily food preparation preferably comprises between 14% and 18% (w/w) by weight of soluble fiber; between 47% and 51% (w/w) by weight of insoluble fiber.

The carbohydrates (carbohydrates) contained in the first embodiment of the daily food preparation preferably originate from bread and fruit.

The proteins of the daily food preparation preferably originate from whole wheat bread, vegetables, and combinations thereof.

The lipids of the daily food preparation preferably originate from wholemeal bread, extra virgin olive oil and combinations thereof.

The fibers contained in the daily food preparation preferably originate from whole wheat bread, vegetables, fruit, and combinations thereof.

Preferably, the daily food preparation of the invention further comprises aqueous drinks in a total amount of between 1.5 L and 3.0 L, more preferably between 2.0 and 2.5 L.

According to a preferred embodiment, the daily food preparation according to the invention provides for the intake of at least 2 liters of liquids during the autumn/winter season and at least 2.5 liters of liquids during the spring/summer season. The daily intake of liquids in such quantities is important to ensure adequate hydration, in order to dispose of the organic acids (e.g. acetoacetic acid and beta-hydroxybutyric) that accumulate in the blood during the diet, and also as a remedy for decreased sense of thirst that can be associated with calorie restriction. In order to stimulate thirst, and therefore to guarantee a sufficient intake of liquids to the patient, the daily food preparation provides for the possibility of intaking non-caloric, water-based drinks.

By non-caloric drink is meant a drink having an average caloric content lower than 10 Kcal/liter.

Preferably, the non-caloric aqueous drink is selected from the group consisting of water, green or black tea, coffee, non-caloric herbal teas, and combinations thereof.

Preferably, the coffee (espresso) is taken in quantities not exceeding two cups a day (about 8 cl, equivalent to about 5 Kcal).

2nd Embodiment

According to a second embodiment, the daily food preparation of the invention comprises a nutritional combination (A2) containing carbohydrates in an amount comprised between 8% and 12% by weight on the total weight of the nutritional combination (w/w), preferably between 9% and 11% (w/w), preferably between 10% and 11% (w/w), preferably of 10.33% (w/w), proteins in an amount comprised between 7% and 11% by weight on the total weight of the nutritional combination (w/w), preferably between 8% and 10% (w/w), preferably between 9% and 10% (w/w), preferably of 9.95% (w/w), lipids in an amount comprised between 77% and 81% by weight on the total weight of the nutritional combination (w/w), preferably between 78% and 80% (w/w), preferably between 79% and 80% (w/w), preferably of 79.28% (w/w);

dietary fiber (B2) in an amount comprised between 2 g and 6 g, preferably between 3 g and 5 g, preferably between 4 g and 5 g, preferably of 4.15 g, the second embodiment of the daily food preparation being characterized by a average caloric content between 150 and 300 Kcal, in which the nutritional combination (A2) and dietary fiber (B2) consist of foods of vegetable origin.

Preferably, the daily food preparation according to the second embodiment has an average calorie content of about 300 Kcal.

Preferably, such second embodiment is intended for use as an adjuvant for the diet of patients suffering from neoplasia for a period of time ranging from 2 to 4 consecutive days, more preferably 3 consecutive days.

More preferably, said second embodiment is intended for use as an adjuvant for the diet of patients suffering from neoplasia on the second, third and fourth day of the diet.

According to a preferred embodiment, at least 87% by weight of the nutritional combination (A2) consists of carbohydrates and lipids. More preferably, the nutritional combination (A2) consists of between 87% and 91% by weight (w/w) of carbohydrates and lipids.

The carbohydrates of the daily food preparation of the invention preferably comprise between 4% and 8% (w/w) by weight of starches; between 91% and 95% (w/w) by weight of soluble carbohydrates.

The lipids of the daily food preparation preferably comprise between 7% and 11% (w/w) by weight of saturated fat; between 26% and 30% (w/w) by weight of monounsaturated fats; between 1% and 5% (w/w) by weight of polyunsaturated fats.

The dietary fiber (B2) of the daily food preparation preferably comprises between 10% and 14% (w/w) by weight of soluble fiber; between 83% and 87% (w/w) by weight of insoluble fiber.

The carbohydrates (carbohydrates) contained in the first embodiment of the daily food preparation preferably originate from bread and fruit.

The proteins of the daily food preparation preferably originate from vegetables, dried fruit, and combinations thereof.

The lipids of the daily food preparation preferably originate from extra virgin olive oil, dried fruit, and combinations thereof.

The fibers contained in the daily food preparation preferably originate from whole wheat bread, vegetables, fruit, and combinations thereof.

Preferably, the daily food preparation of the invention further comprises aqueous drinks in a total amount of between 1.5 L and 3.0 L, more preferably between 2.0 and 2.5 L.

According to a preferred embodiment, the daily food preparation according to the invention provides for the intake of at least 2 liters of liquids during the autumn/winter season and at least 2.5 liters of liquids during the spring/summer season. The intake of liquids in such quantities is important to ensure adequate hydration, in order to dispose of the organic acids (e.g. acetoacetic acid and beta-hydroxybutyric) that accumulate in the blood during the diet, and also as a remedy for decreased sense of thirst that can be associated with calorie restriction. In order to stimulate thirst, and therefore to guarantee a sufficient intake of liquids to the patient, the daily food preparation provides for the possibility of intaking non-caloric, water-based drinks.

By non-caloric drink is meant a drink having an average caloric content lower than 10 Kcal/liter.

Preferably, the non-caloric aqueous drink is selected from the group consisting of water, green or black tea, coffee, non-caloric herbal teas, and combinations thereof.

Preferably, the coffee (espresso) is taken in quantities not exceeding two cups a day (about 8 cl, equivalent to about 5 Kcal).

3rd Embodiment

According to a third embodiment, the daily food preparation of the invention comprises a nutritional combination (A3) containing carbohydrates in an amount comprised between 46% and 50% by weight on the total weight of the nutritional combination (w/w), preferably between 47% and 49% (w/w), preferably between 48% and 49% (w/w), preferably of 48.05% (w/w), proteins in an amount comprised between 12% and 16% by weight on the total weight of the nutritional combination (w/w), preferably between 13% and 15% (w/w), preferably between 14% and 15% (w/w), preferably of 14.47% (w/w), lipids in an amount comprised between 35% and 39% by weight on the total weight of the nutritional combination (w/w), preferably between 36% and 38% (w/w), preferably between 37% and 38% (w/w), preferably of 37.64% (w/w);

dietary fiber (B3) in an amount comprised between 10 g and 14 g, preferably between 11 g and 13 g, preferably between 12 g and 13 g, preferably of 12.2 g, the third embodiment of the daily food preparation being characterized by a average caloric content between 150 and 300 KCal, in which the nutritional combination (A3) and dietary fiber (B3) consist of foods of vegetable origin.

Preferably, the daily food preparation according to the second embodiment has an average calorie content of about 300 Kcal.

Preferably, such third embodiment is intended for use as an adjuvant for the diet of patients suffering from neoplasia for a period of 1 day.

More preferably, said third embodiment is intended for use as an adjuvant the diet of patients suffering from neoplasia on day five of the diet.

According to a preferred embodiment, at least 83% by weight of the nutritional combination (A3) consists of carbohydrates and lipids. More preferably, the nutritional combination (A3) consists of between 83% and 87% by weight (w/w) of carbohydrates and lipids.

The carbohydrates of the daily food preparation of the invention preferably comprise between 12% and 16% (w/w) by weight of starches; between 76% and 80% (w/w) by weight of soluble carbohydrates.

The lipids of the daily food preparation preferably comprise between 11% and 15% (w/w) by weight of saturated fat; between 58% and 62% (w/w) by weight of monounsaturated fats; between 14% and 18% (w/w) by weight of polyunsaturated fats.

The dietary fiber of the daily food preparation preferably comprises between 10% and 16% (w/w) by weight of soluble fiber; between 38% and 42% (w/w) by weight of insoluble fiber.

The carbohydrates (carbohydrates) contained in the first embodiment of the daily food preparation preferably originate from bread and fruit.

The proteins of the daily food preparation preferably originate from fruit, vegetables, and combinations thereof.

The lipids of the daily food preparation preferably originate from extra virgin olive oil.

The fibers contained in the daily food preparation preferably originate from vegetables, fruit, and combinations thereof.

Preferably, the daily food preparation of the invention further comprises aqueous drinks in am amount of between 1.5 L and 3.0 L, more preferably between 2.0 and 2.5 L.

According to a preferred embodiment, the daily food preparation according to the invention provides for the intake of at least 2 liters of liquids during the autumn/winter season and at least 2.5 liters of liquids during the spring/summer season. The intake of liquids in such quantities is important to ensure adequate hydration, in order to dispose of the organic acids (e.g. acetoacetic acid and beta-hydroxybutyric) that accumulate in the blood during the diet, and also as a remedy for decreased sense of thirst that can be associated with calorie restriction. In order to stimulate thirst, and therefore to guarantee a sufficient intake of liquids to the patient, the daily food preparation provides for the possibility of intaking non-caloric, water-based drinks.

By non-caloric drink is meant a drink having an average caloric content lower than 10 Kcal/liter.

Preferably, the non-caloric aqueous drink is selected from the group consisting of water, green or black tea, coffee, non-caloric herbal teas, and combinations thereof.

Preferably, the coffee is taken in quantities not exceeding two cups a day (one cup is equivalent to 150 ml of drink, with an average caffeine content of 0.6 mg/mL, obtained from roasted and ground coffee).

Kit Comprising a Plurality of Daily Food Preparations

A further object of the present invention is a kit comprising daily food preparations according to the invention for use as a therapeutic adjuvant in the daily diet of patients suffering from neoplasias.

Preferably, the kit comprises the first, second and third embodiments of the daily food preparation according to the invention, so as to supply the patient with the food preparations necessary to complete a diet cycle, preferably of 5 consecutive days.

In this sense, what previously discussed in relation to the first, second and third embodiments of the daily food preparation according to the invention applies as it is to the kit.

According to the preferred embodiment, said kit therefore comprises:

a unit of the first daily food preparation containing A1) a nutritional combination comprising carbohydrates in an amount ranging from 51% to 55% (w/w), proteins in an amount ranging from 11% to 15% (w/w) per day, lipids in an amount ranging from 30% to 34% (w/w); and B1) dietary fibre in an amount ranging from 25 g to 29 g, the first daily food preparation being characterized by an average caloric content of about 600 Kcal/day;

a plurality, preferably from 2 to 4 units, preferably 3 units, of the second daily food preparation containing A2) a nutritional combination comprising carbohydrates in an amount ranging from 8% to 12% (w/w), proteins in an amount ranging from 7% to 11% (w/w), lipids in an amount ranging from 77% to 81% (w/w); and B2) dietary fibre in an amount ranging from 2 g to 6 g, the second daily food preparation being characterized by an average caloric content of about 300 Kcal/day;

a unit of the third daily food preparation containing A3) a nutritional combination comprising carbohydrates in an amount ranging from 46% to 50% (w/w), proteins in an amount ranging from 12% to 16% (w/w) per day, lipids in an amount ranging from 35% to 39% (w/w); and B3) dietary fibre in an amount ranging from 12 g to 16 g, the third daily food preparation being characterized by an average caloric content of about 300 Kcal/day;

wherein the components of the nutritional combinations (A1, A2, A3) and the dietary fibre (B1, B2, B3) are foods of vegetable origin.

The use of the daily food preparation according to the invention is associated with a series of significant immunoregulatory effects targeting the peripheral blood of the patients. These effects include:

an important reduction in the percentage of monocyte subpopulations with immunosuppressive function, and cytokines responsible for their mobilization from the bone marrow a simultaneous increase in the percentage of activated anticancer lymphocyte subpopulations, which in various studies have shown to correlate with a better response of patients to standard anticancer treatments. These immunoregulatory effects had never been previously described in patients suffering from different types of neoplasias. Our recent discoveries show that the experimental diet is able to stimulate the activation of anticancer immunity in patients suffering from different types of neoplasias, treated with different types of concomitant anticancer therapies.

EXAMPLES

For illustrative and non-limiting purposes, below are examples of the daily food preparation and the kit according to the invention.

Example 1: Experimental Diet in a Patient with Breast Cancer and Treated with Concomitant Chemotherapy day 1: Breakfast: a cup of green tea. Lunch: 100 gr of cauliflower, 90 gr of broccoli, 70 gr of mixed salad and 20 gr of fennel, seasoned with salt and a spoonful of extra virgin olive oil (12 g), plus 100 gr of wholemeal bread. Dinner: green salad and one 150 g apple. About 2 liters of water day 2: Breakfast: 1 cup of green tea. Lunch: 100 gr of cauliflower+100 gr of broccoli, seasoned with teaspoon of extra virgin olive oil (6 g) and ¼ of lemon; 1 no-sugar coffee. Dinner: 12 gr of nuts.

day 3: Breakfast: 1 cup of black tea. Lunch: 200 gr of Brussels sprouts with a teaspoon of extra virgin olive oil (6 g). Dinner: 15 gr of almonds. Also 2 liters of water during the day.

day 4: Breakfast: 1 cup of black tea. Lunch: 200 gr of cauliflower and Brussels sprouts seasoned with teaspoon of extra virgin olive oil (6 g). Dinner: 80 gr of green salad with 12 gr of walnuts.

day 5: Breakfast: 1 green tea. Lunch: 300 gr of spinach, broccoli, fennel, salad, seasoned with a spoonful of extra virgin olive oil (12 g)+half of a 200 g apple (100 g in total). Dinner: 100 gr of green salad seasoned with teaspoon of oil+half of a 200 g apple (100 g in total).

Example 2: Experimental Diet in a Patient with Lung Cancer not Treated with Other Concomitant Anticancer Treatments day 1: Breakfast: nothing. Lunch: 200 g of salad+40 g of onions+1 tablespoon of extra virgin olive oil (12 g)+70 g of whole wheat bread. Dinner: 100 g of salad+1 teaspoon of olive oil (6 g)+one 150 g apple day 2: Breakfast: 2 herbal teas. Lunch: 120 g of salad+20 g of fennel+1 teaspoon of extra virgin olive oil (6 g). Dinner: 25 g of shelled walnuts.

day 3: Breakfast: 2 non-caloric herbal teas (ginger+chilli pepper). Lunch: 150 g of cabbage+1 teaspoon of extra virgin olive oil (5 g). Dinner: 20 g of shelled walnuts day 4: Breakfast: 2 non-caloric herbal teas. Lunch: 100 g of fennel+1 teaspoon of extra virgin olive oil (5 g). Dinner: 20 g of shelled walnuts.

day 5: Breakfast: 2 non-caloric herbal teas. Lunch: 180 g of spinach+1 tablespoon of extra virgin olive oil (5 g). Dinner: 130 g of salad+1 teaspoon of extra virgin olive oil (5 g).

The invention claimed is:

1. A dietary method for enhancing the effect of anticancer treatments in patients suffering from neoplasia consisting of administering daily to a patient in need thereof
   (I) a food preparation consisting of
      A) a nutritional combination that consists of
         carbohydrates in an amount ranging from 8% and 55% (w/w),
         proteins in an amount ranging from 7% and 16% (w/w),
         lipids in an amount ranging from 30% and 81% (w/w); and
      B) dietary fiber in an amount ranging from 2 and 30 g, and
   (II) a non-caloric aqueous drink and/or coffee in an amount ranging from 1.5 to 2.5 L, wherein
      i) said food preparation (I) is administered every 3 to 4 weeks for 5 days according to the following daily caloric intake
         on the first day from 450 to 600 Kcal;
         on each $2^{nd}$, $3^{rd}$, $4^{th}$ and $5^{th}$ day from 150 to 300 Kcal;
      ii) the nutritional combination of (A) and the dietary fiber (B) of said food preparation consists of foods of vegetable origin
      iii) the anticancer treatments are selected from
         a) a radiotherapy and chemotherapy anticancer treatment, or
         b) radiotherapy anticancer treatment;
         c) chemotherapy anticancer treatment;
         d) immunotherapy anticancer treatment, or an endocrine anticancer treatment,
         e) an anticancer treatment with molecularly targeted biological drugs, and
      iv) said food preparation (I) and said non-caloric aqueous drink (II) are administered before, during or after said anticancer treatments a), b), c), d) or e).

2. The dietary method according to claim 1, wherein at least 83% (w/w) by weight of the nutritional combination (A) consists of carbohydrates and lipids.

3. The dietary method according to claim 1, wherein the carbohydrates comprise between 4% and 63% (w/w) by weight of starches and between 42% and 95% (w/w) by weight of soluble carbohydrates.

4. The dietary method according to claim 1, wherein the lipids comprise between 7% and 16% (w/w) by weight of saturated fats; between 26% and 65% (w/w) by weight of monounsaturated fats; between 1% and 18% (w/w) by weight of polyunsaturated fats.

5. The dietary method according to claim 1, wherein the dietary fiber comprises between 10% and 18% (w/w) by weight of soluble fiber and between 38% and 87% (w/w) by weight of insoluble fiber.

6. The dietary method according to claim 1, wherein the foods of vegetable origin are raw or cooked foods.

* * * * *